(12) United States Patent
Van Steijn et al.

(10) Patent No.: US 9,408,402 B2
(45) Date of Patent: Aug. 9, 2016

(54) PROCESSING LINE AND METHOD FOR INSPECTING A POULTRY CARCASS AND/OR A VISCERA PACKAGE TAKEN OUT FROM THE POULTRY CARCASS

(71) Applicant: Meyn Food Processing Technology B.V., Oostzaan (NL)

(72) Inventors: Aloysius Christianus Maria Van Steijn, Oostzann (NL); Rick Sebastiaan Van Stralen, Oostzaan (NL); Nils Ten Hoeve, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 14/974,712

(22) Filed: Dec. 18, 2015

(65) Prior Publication Data
US 2016/0174583 A1    Jun. 23, 2016

(30) Foreign Application Priority Data
Dec. 22, 2014   (NL) .................................... 2014037

(51) Int. Cl.
*A22C 21/00*   (2006.01)
*A22C 17/00*   (2006.01)

(52) U.S. Cl.
CPC ......... *A22C 17/0073* (2013.01); *A22C 21/0053* (2013.01)

(58) Field of Classification Search
CPC ..... A22C 21/0053; A22C 21/00; A22B 5/007
USPC .......................... 452/177, 179, 180, 182–184
See application file for complete search history.

(56) References Cited

U.S. PATENT DOCUMENTS

| | | | | |
|---|---|---|---|---|
| 4,570,299 A * | 2/1986 | Ellis | ...................... | A22C 21/00 209/702 |
| 4,616,381 A | 10/1986 | Harris | | |
| 5,980,377 A * | 11/1999 | Zwanikken | ............ | A22B 5/007 452/158 |
| 6,227,960 B1 | 5/2001 | Martin | | |
| 6,912,434 B2 * | 6/2005 | van den Nieuwelaar | ............ | A22B 3/005 452/53 |
| 7,134,956 B2 * | 11/2006 | Lee | ..................... | A22C 21/0007 452/179 |
| 7,828,639 B2 * | 11/2010 | Nielsen | ................ | A22B 5/0064 452/198 |
| 8,105,138 B2 * | 1/2012 | Van Den Nieuwelaar | ........ | A22C 21/0038 452/177 |
| 8,878,651 B2 * | 11/2014 | Kwak | .................. | A22B 5/0064 340/10.1 |

FOREIGN PATENT DOCUMENTS

EP    1222858 A2    7/2002
WO    WO0176378 A1   10/2001

OTHER PUBLICATIONS

PCT Search Report dated Jul. 3, 2015 for application 2014037.

* cited by examiner

*Primary Examiner* — Richard Price, Jr.
(74) *Attorney, Agent, or Firm* — Dority & Manning, P.A.

(57) ABSTRACT

Processing line and method for inspecting a poultry carcass and/or a viscera package taken out from the poultry carcass, wherein the poultry carcass and/or viscera package moves in the processing line and wherein the inspection is carried out by an inspector selecting a particular poultry carcass and/or viscera package as to be rejected, wherein the selection of the particular poultry carcass and/or viscera package to be rejected is executed by the inspector without touching said poultry carcass and/or viscera package.

22 Claims, 5 Drawing Sheets

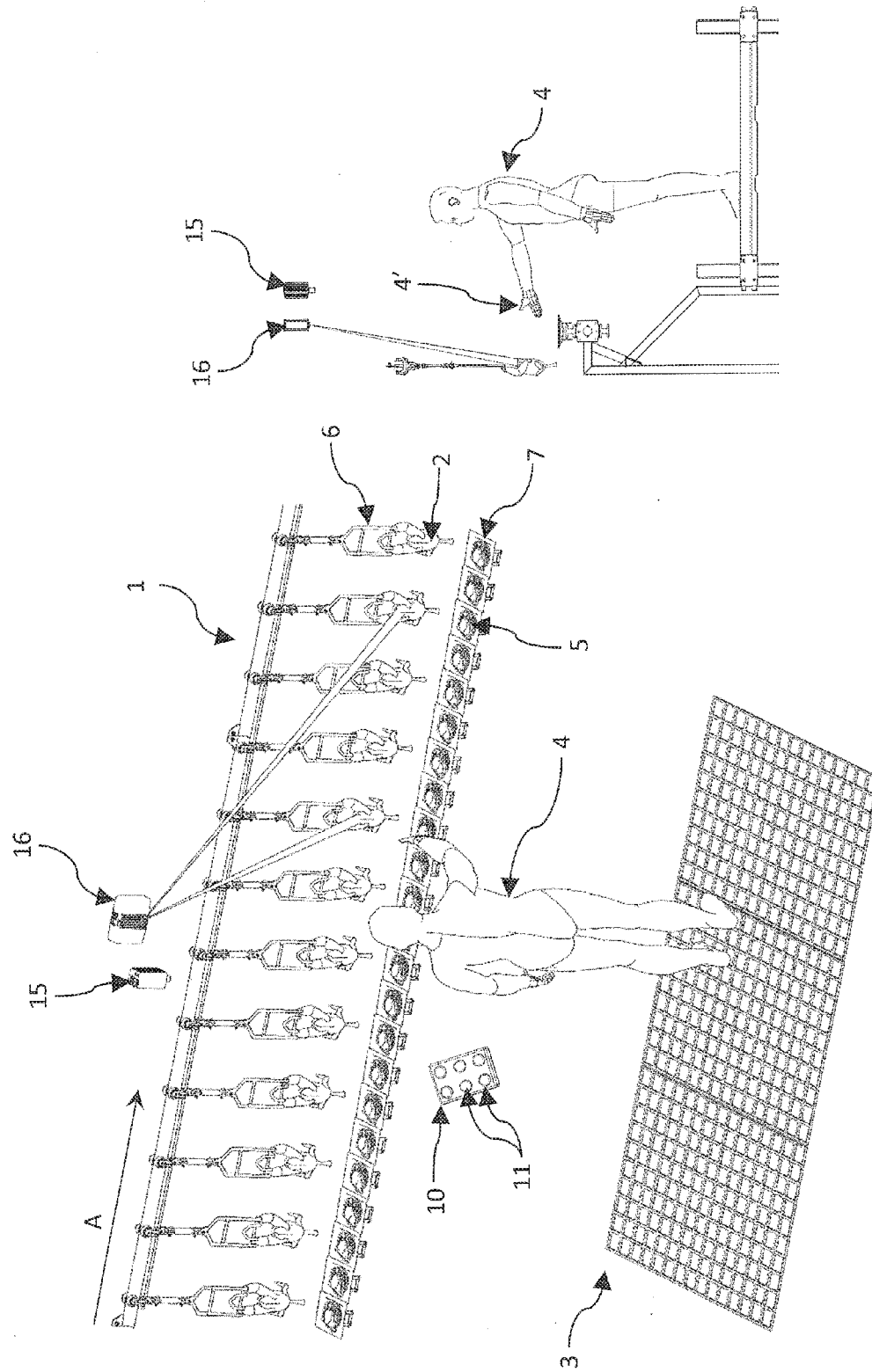

PROCESSING LINE AND METHOD FOR INSPECTING A POULTRY CARCASS AND/OR A VISCERA PACKAGE TAKEN OUT FROM THE POULTRY CARCASS

PRIORITY STATEMENT

The present application claims priority under 35 U.S.C. §119 to Dutch Application No. 2014037, filed Dec. 22, 2014.

FIELD OF THE INVENTION

The subject of the present disclosure relates to inspection of poultry carcasses, which may move along a processing line.

BACKGROUND OF THE INVENTION

A method and apparatus for inspecting poultry carcasses are known from the European patent application EP 1 222 858. This application discusses the article "Hands-off Inspection Proving Processors' Utopia" by David Amey in the journal PPM (Poultry Processing and Marketing) of January 1978, pages 28-33. In an effort to bring Utopia to reality, EP 1 222 858 proposes an inspection system wherein the inspection can be carried out using a series of cameras, therewith obviating the need to employ inspectors for this purpose.

As a rule, however, the law prevents inspection of poultry carcasses and their viscera packages by a fully automatic process without human intervention. An inspection system employing only cameras and no inspectors, therefore, never has become reality.

Moreover, in the system proposed by EP 1 222 858 a complete replacement of human inspection by camera based inspection using a machine only is not accomplished. According to this document (FIG. 3 and Col. 10, lines 38-46), inspection can be carried out by an inspector, who can approve or reject a carcass or a cluster of viscera by pressing one or more buttons, whereas the inspection can also be carried out with the aid of a camera. As set forth at Column 11, line 54 to column 12 line 3 the buttons are used to transmit an eject signal to a control system, which is adapted to remove the viscera from a drawing member and/or to remove the carcass from its hook. This is further explained with reference to the document's FIGS. 5 and 5A. From the ensuing discussion with reference to FIGS. 5, 5A and 5B, it follows that the actual inspection is carried out by the inspector touching the poultry carcasses. Column 14, lines 40-56 of EP 1 222 858 mentions that at least one inspection takes place carried out by an inspector and/or with the aid of a camera. If the viscera cluster and/or a carcass is rejected, the inspector draws the associated carcass towards him, so that it is no longer located in the path of conveyance of the remaining carcasses. The open spots in the path of conveyance of the carcasses are detected with a sensor, and a control system which is connected to this sensor generates an eject signal for the associated viscera cluster. Pushing the button as is mentioned above is then apparently still required for also removing the poultry carcass from its hook. The actual selection of the poultry to be rejected is, however, done by the inspector manually moving a particular poultry carcass out of its path of conveyance, when the associated viscera cluster or the poultry carcass itself meets objection. Obviously, this method of operation involves a considerable risk of cross contamination.

WO01/76378 discloses a method and a plant for inspecting slaughtered poultry wherein poultry carcasses are suspended by the legs and moved in a processing line in a first conveyor, viscera packs are eviscerated and suspended from a second conveyor, and wherein selection of a certain carcass for rejection or closer inspection automatically results in taking down this carcass and the associated viscera pack. The inspection of the carcasses and the viscera packs respectively occurs by manual, visual inspection, preferably without touching the carcasses and the viscera packs, respectively.

SUMMARY OF THE INVENTION

The invention relates to a method for inspecting a poultry carcass and/or a viscera package taken out from the poultry carcass, wherein said poultry carcass and/or viscera package moves in a processing line and wherein the inspection is carried out by an inspector selecting a particular poultry carcass and/or viscera package as to be rejected. The invention also relates to a processing line for poultry embodied with an inspection facility enabling an inspector to inspect poultry carcasses and/or viscera packages moving in the processing line. Aspects and advantages of the invention will be set forth in part in the following description, or may be obvious from the description, or may be learned through practice of the invention.

In one exemplary aspect, it is one of the objectives of the invention to improve hygiene during the inspection process.

In another exemplary aspect, it is another objective of the invention to meet current demand for high operational speeds of the processing line to make it possible to process 6000 chickens or more per hour without the inspection process being a limiting factor.

These and other objectives and advantages of the invention are at least in part promoted by the features of one or more of the appended claims.

In one exemplary method of the invention for inspecting a poultry carcass and/or a viscera package that is taken out from the poultry carcass, the selection of the particular poultry carcass and/or viscera package to be rejected is executed by the inspector without touching the poultry carcass and/or viscera package, wherein the selection of the particular poultry carcass and/or viscera package which is to be rejected is carried out by the inspector actuating a noncontact sensor that is arranged to provide signals indicative of a position and/or an orientation of at least one of his bodily parts and/or of a pointer held by the inspector. The inspector moves the concerning bodily part and/or the pointer to a position that identifies the particular poultry carcass and/or viscera package that is to be rejected.

Accordingly, the processing line of the invention is embodied with an inspection facility enabling an inspector to inspect poultry carcasses and/or viscera packages moving in said processing line, wherein the inspection facility is arranged to enable the inspector to select the particular poultry carcass and/or viscera package to be rejected without touching the poultry carcass and/or viscera package, wherein the inspection facility is provided with a noncontact sensor that is arranged to provide signals indicative of a position and/or an orientation of at least one bodily part of the inspector and/or of a pointer held by the inspector.

In one particular exemplary embodiment, the sensor is provided with a cooperating source of ultrasonic waves or laserlight. The sensor and source of ultrasonic waves or laserlight cooperate to determine a position of the inspector's hand. The inspector can thus move his hand to a position that identifies the particular poultry carcass and/or viscera package that is to be rejected.

In another embodiment, a sensor or sensors are provided in a handheld device wherein the sensor or sensors determine the position and/or orientation of the handheld device, so as to arrange that the inspector can move the handheld device to a position and/or orientation that identifies the particular poultry carcass and/or viscera package that is to be rejected.

In one exemplary embodiment, the sensor is a camera system which is arranged to monitor and determine the position and/or orientation of the inspectors bodily part or of a pointer held by the inspector so that the inspector can move his concerning bodily part or the pointer to a position and/or orientation which identifies the particular poultry carcass and/or viscera package that is to be rejected.

In a suitable arrangement of this exemplary embodiment aimed at monitoring the inspectors bodily part, the inspector may for instance wear glasses that are provided with such a camera system for monitoring the inspectors eyeball or eyeballs so as to detect the inspectors line of sight, so that the inspector simply may look at the particular poultry carcass and/or viscera package to identify same as the poultry carcass and/or viscera package that is to be rejected.

In another exemplary implementation of this exemplary embodiment, which may be a very appropriate realization, the sensor is a 3-D camera system is arranged to monitor and determine the position and/or orientation of the inspectors hand or a pointer in the inspector's hand, so that the inspector can move his hand and/or the pointer to a position and/or orientation that identifies the particular poultry carcass and/or viscera package that is to be rejected.

In exemplary embodiments of the invention, in addition to the inspector actuating the sensor that is arranged to provide signals indicative for a position of the inspectors bodily part or of a pointer held by the inspector, corresponding to the poultry carcass and/or the viscera package which is to be rejected, the inspector further operates acknowledgment means to confirm and complete such actuation of the sensor to confirm and complete the selection of the particular poultry carcass and/or viscera package that is to be rejected.

Accordingly, in certain exemplary embodiments, the inspection facility includes acknowledgment means enabling the inspector to confirm and complete actuation of the sensor for the selection of the particular poultry carcass and/or viscera package that is to be rejected.

There are several manners of providing such acknowledgment means. In one exemplary aspect, the acknowledgment means are voice controlled and/or gesture controlled and/or push button controlled. Certain embodiments include options of providing voice controlled and/or gesture controlled acknowledgment means, since this enables the inspector to entirely operate hands-free. The gesture controlled acknowledgment means can be implemented as part of the 3-D camera system, which can be arranged to recognize certain gestures of the inspector, which are then deemed as a token of acknowledgment.

In another exemplary embodiment, acknowledgment means are used that provide an intrinsic link to selecting a particular cause or reason of rejecting the poultry carcass and/or the viscera package. With the acknowledgment of a particular poultry carcass and/or viscera package then also the reason why the poultry carcass and/or viscera package is rejected is known, which is useful for possible further processing of the rejected poultry carcass and/or viscera package. In a push button controlled system the respective push buttons may be linked to the possible causes or reasons of rejection, so that the selection of a particular push button indicates the actual cause or reason of rejection. In a gesture controlled system the inspector may select from a series of possible gestures that collectively form a library of possible reasons of rejection, the gesture that best suits the actual cause or reason of rejection. A voice controlled system can be implemented more robust, in that specific voice-commands can be predefined that relate to particular known reasons for rejection.

In certain exemplary embodiments of the invention, the inspector is provided with visual feedback regarding the poultry carcass and/or the viscera package that he has selected to be rejected. For this there are several possible forms of implementation.

In one example, a moving light bar is provided adjacent to the processing line, which moving light bar is arranged with light of different colors respectively reflecting approved and rejected poultry carcasses and/or viscera packages, wherein the respective lights of the moving light bar move synchronously with and in keeping with the concerning poultry carcasses and/or viscera packages.

In another exemplary implementation requiring less wiring than a moving light bar, one or more beamers are provided to project light of different colors respectively reflecting approved and rejected poultry carcasses and/or viscera packages, wherein the respective lights of the beamers move synchronously with the concerning poultry carcasses and/or viscera packages to maintain their projection of light on the poultry carcasses and/or viscera packages consistent with the approvals and rejections concerning such poultry carcasses and/or viscera packages.

The different colors emitted by the moving light bar or by the beamer or beamers may also be arranged such that for each cause or reason of rejection there is a separate color, so that the inspector is provided with visual feedback not only on the poultry carcasses and/or viscera packages that are rejected, but also on the reasons for their rejection.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 5A and 5B show in an isometric view and in a side view a third exemplary embodiment of a processing line with an inspection facility according to an exemplary embodiment of the invention.

Whenever in the figures the same reference numerals are applied, these numerals refer to the same or similar parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
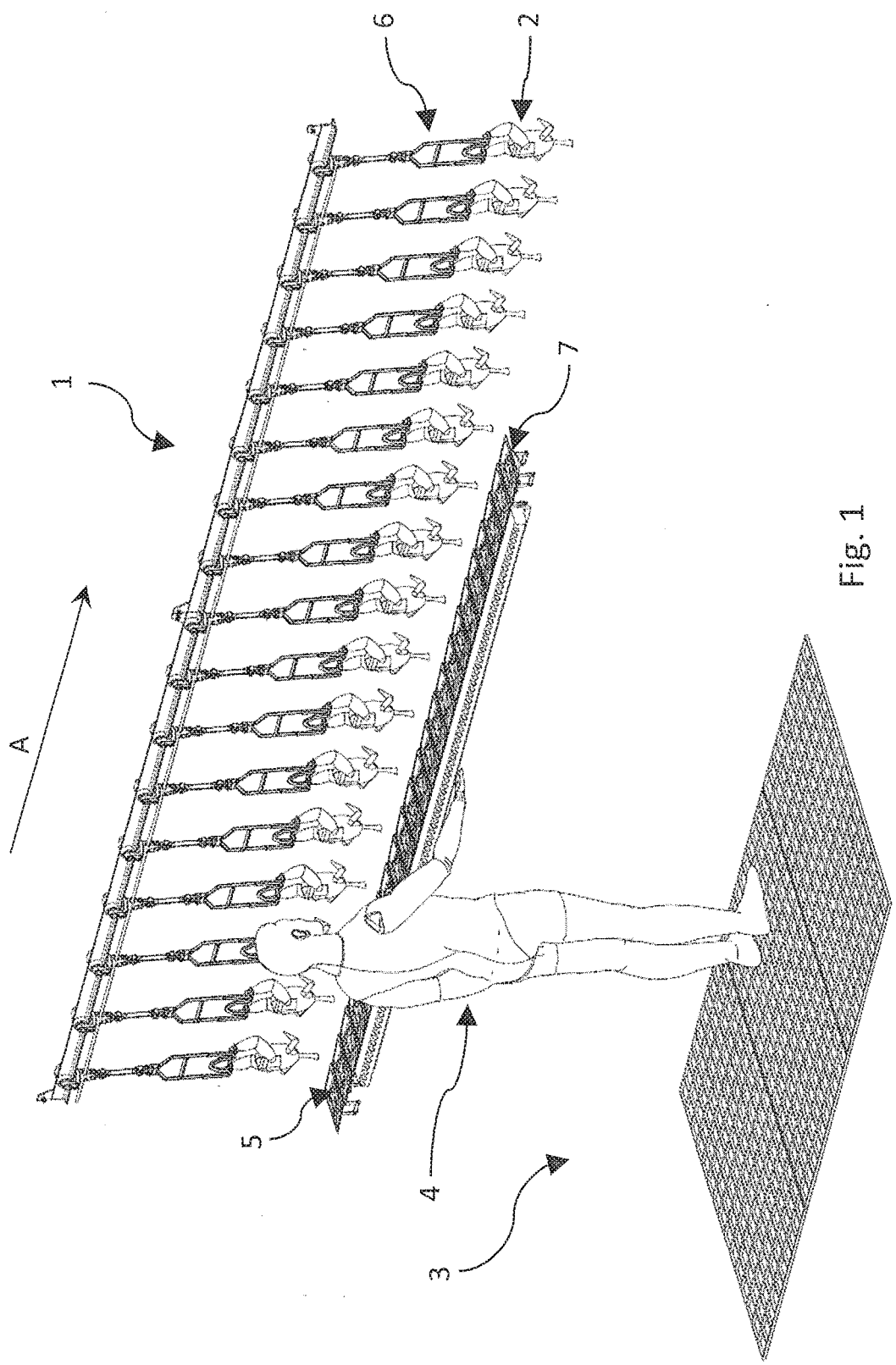
FIG. 1 shows a part of an processing line with an inspection facility common to the prior art and the invention.

Making first reference to FIG. 1, the generally known situation is depicted in which a processing line 1 for poultry 2 is embodied with an inspection facility 3 enabling an inspector 4 to inspect poultry carcasses 2 and/or viscera packages 5. In the situation shown in FIG. 1, the viscera packages 5 are completely detached from the poultry carcasses 2 that are suspended by the legs in conveyor hooks 6 of the processing line 1. The detached viscera packages 5 are placed in trays 7 that move along synchronously with the poultry carcasses 2 in the conveying direction A of the processing line 1. This secures the maintenance of a one-on-one relation between the poultry carcasses 2 in the hooks 6, and the viscera packages 5 that are removed from the poultry carcasses 2. Thus, when an inspector 4 finds that either a viscera package 5 or a poultry carcass 2 gives rise to a rejection, both the concerning particular poultry carcass 2 and the corresponding viscera package 5 that is taken out from such poultry carcass can be removed from the processing line 1.

According to an exemplary aspect of the invention, the inspection facility 3 is arranged to enable the inspector 4 to select the particular poultry carcass 2 and/or viscera package 5 to be rejected without touching either the poultry carcass or the viscera package or having the poultry carcass or the viscera package touched by an assistant. Generally speaking, in exemplary embodiments of the invention the inspection facility 3 is provided with a noncontact sensor that is arranged to provide signals indicative of a position and/or an orientation of a bodily part of the inspector 4 to determine a particular poultry carcass 2 and/or viscera package 5 that is to be rejected. Rather than obtaining the position and/or orientation of a bodily part of the inspector 4, it is also possible to measure the position and/or orientation of a pointer held by the inspector to select a poultry carcass and/or viscera package which is to be rejected. One thing and another can be implemented in several ways which will be discussed hereinafter with reference to FIG. 2 and with particular reference to FIGS. 3-5, which figures do however not show the option of the inspector holding a pointer. Showing this latter option is superfluous since the skilled person is perfectly knowledgeable with the manner in which an inspector can hold and use such a pointer.

Figure 2:
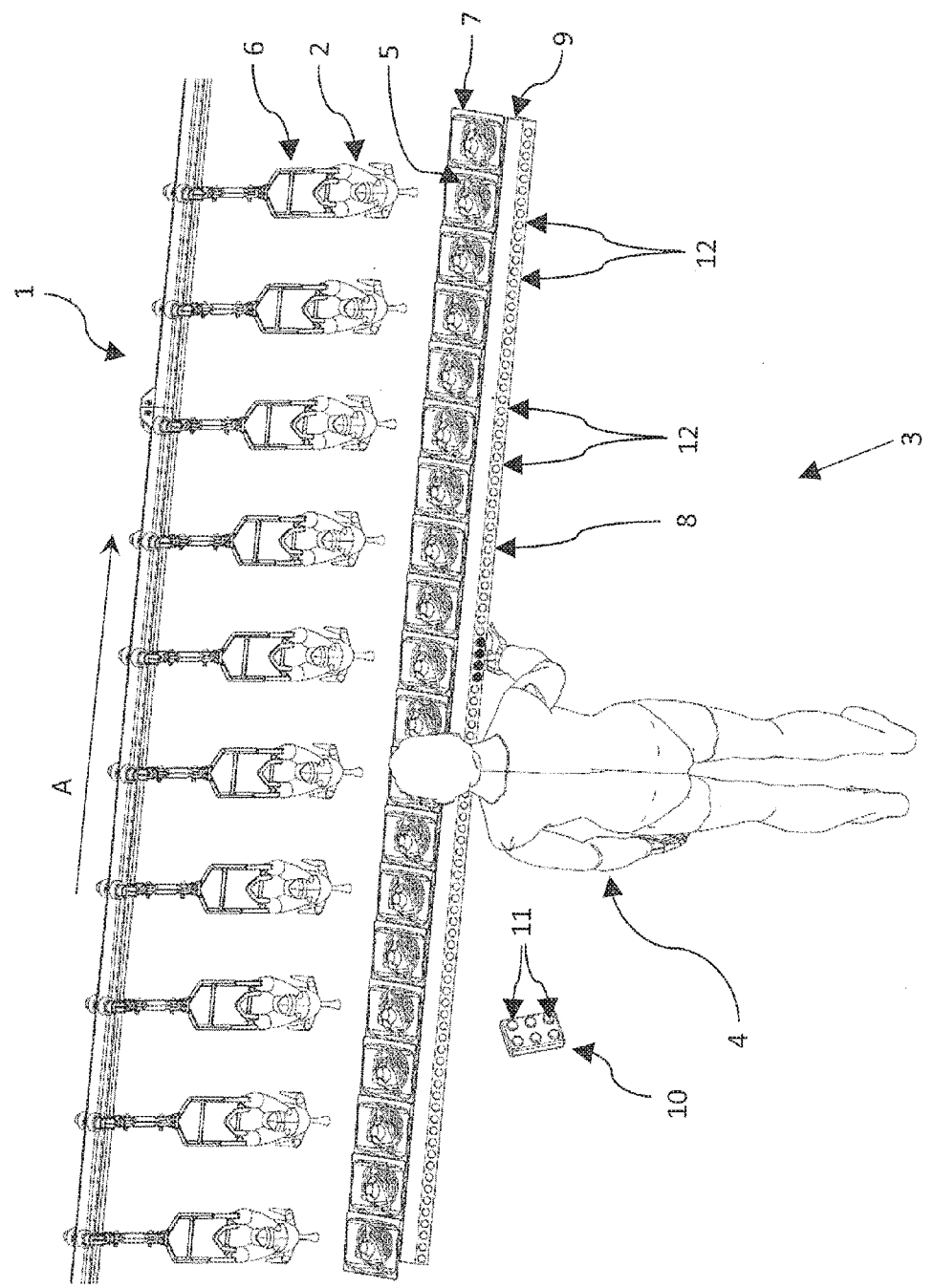
FIG. 2 provides a view at a processing line with an inspection facility with features according to the prior art and with features according to the invention.

FIG. 2 first shows an embodiment with an inspection facility 3 that in accordance with the prior art is provided with a sensor or sensors 8 placed in a support 9 adjacent to the path of the poultry carcass 2 and/or viscera package 5 in the processing line 1, which sensor or sensors 8 are embodied as pressure or touch sensitive sensors. The sensors or at least one of the sensors 8 may be pressed or touched by the inspector 4 to select one or more of the poultry carcasses 2 and/or one or more of the viscera packages 5 that are to be rejected.

Different from the prior art, however, FIG. 2 further shows that the inspection facility 3 includes acknowledgment means 10 enabling the inspector 4 to confirm and complete therewith the actuation of the pressed or touched sensor or sensors 8. In this shown embodiment, the acknowledgment means 10 is embodied as a remote control device equipped with push buttons 11 to confirm the actuation of the selected sensor or sensors 8. The respective push buttons 11 may be linked to the possible causes or reasons of rejection, so that the selection of a particular push button indicates the actual cause or reason of a rejection by the inspector 4. It is also possible to embody the acknowledgment means 10 differently with touch sensitive buttons, or in the manner as will be explained hereinafter with reference to several embodiments of the invention. Rather than push buttons 11 for instance, a gesture controlled system or a voice controlled system may be applied to confirm and complete the selection of the poultry carcasses 2 and/or viscera packages 5 to be rejected.

Adjacent to the path of the poultry carcasses 2 and/or viscera packages 5 in the processing line 1, the support 9 may also be provided with a moving light bar 12 which is arranged with light of different colours respectively reflecting approved and rejected poultry carcasses 2 and/or viscera packages 5, wherein the respective lights of the moving light bar are arranged to move synchronously with and in keeping with the respective approved and rejected poultry carcasses 2 and/or viscera packages 5. This provides effective visual feedback to the inspector 4 regarding the poultry carcasses 2 and viscera packages 5 that are approved respectively rejected. Also this system of visual feedback can be implemented differently, for instance, with a beamer or beamers that project light of a particular colour representative of either approval or rejection on the concerning poultry carcasses 2. Such a visual feedback system will be discussed further hereinafter with reference to one of the other exemplary embodiments of the invention.

Figure 3:
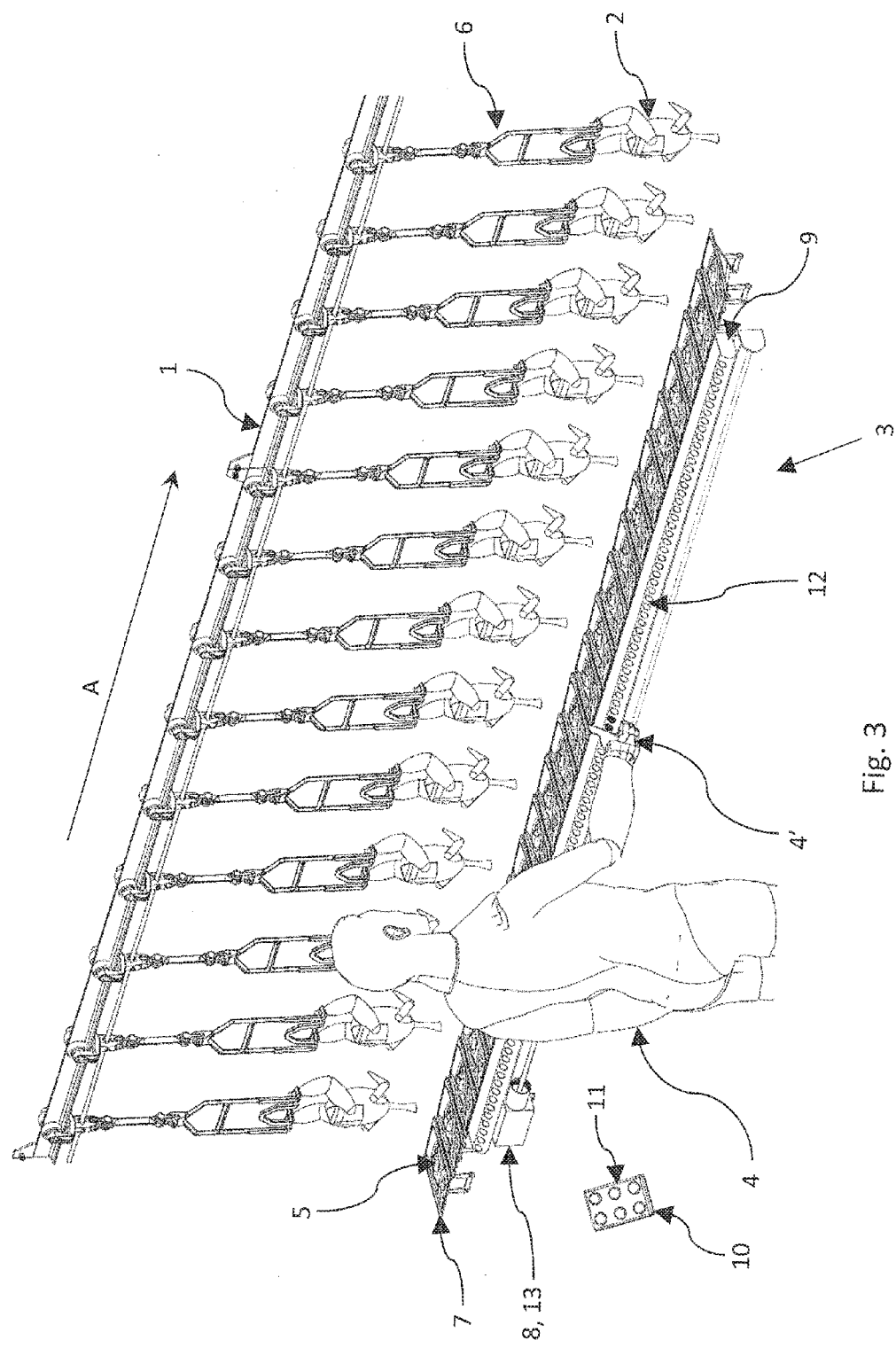
FIG. 3 shows a first exemplary embodiment of a processing line with an inspection facility according to an exemplary embodiment the invention.

FIG. 3 shows an embodiment in which the inspection facility 3 is provided with a sensor 8 and a source 13 of ultrasonic waves or laserlight that cooperates with said sensor 8 to determine a position of the inspectors hand 4' (or not shown: of a position of a pointer held by the inspector) and to determine a particular poultry carcass 2 and/or viscera package 5 that is to be rejected. Instead of a laserlight source also for instance a source of ultrasonic sound can be applied. When the inspector 4 positions his hand 4' between the source 13 of laser or sound and the sensor 8, this inflicts a reflection of the laserlight or sound that can be measured by the sensor 8, wherein the time difference between the laserlight or sound leaving the source 13 and arriving at the sensor 8 can be measured and used as a measure for the location where the inspector 4 has positioned his hand 4'. Thus, an accurate determination is possible of the poultry carcass 2 and/or the viscera package 5 that are selected to be rejected. Similarly as is the case in the embodiment discussed with reference to FIG. 2, in this embodiment the inspection facility 3 also comprises acknowledgment means 10 enabling the inspector 4 to confirm and complete therewith the actuation of the sensor 8. The acknowledgment means 10 is for instance embodied as a remote control equipped with push buttons 11 to confirm the actuation of the sensor 8 by receipt of the reflected laserlight or sound. The respective push buttons 11 are preferably linked to the possible causes or reasons of rejection, so that the selection of a particular push button indicates the actual cause or reason of a rejection by the inspector 4. Also in this embodiment it is possible to embody the acknowledgment means 10 differently as will be explained hereinafter. Rather than push buttons 11 or touch sensitive buttons also a gesture controlled system or a voice controlled system may be applied to confirm and complete the selection of the to be rejected poultry carcasses 2 and/or viscera packages 5 as determined with the sensor 8.

Similarly as is the case in the embodiment of FIG. 2, also in this embodiment of FIG. 3 there is a support 9 adjacent to the path of the poultry carcasses 2 and/or viscera packages 5 in the processing line 1, which support 9 can be provided with a moving light bar 12 which is arranged with light of different colors respectively reflecting approved and rejected poultry carcasses 2 and/or viscera packages 5. The respective lights of the moving light bar are arranged to move synchronously with and in keeping with the respective approved and rejected poultry carcasses 2 and/or viscera packages 5 to provide effective visual feedback to the inspector 4 regarding the poultry carcasses 2 and viscera packages 5 that are approved respectively rejected. Also in this embodiment the system of visual feedback can be implemented differently, for example with a beamer or beamers that project light of a particular color representative of either approval or rejection on the concerning poultry carcasses 2.

One further possible embodiment which is not extensively shown in the figures of the drawings is arranged with an inspection facility that is provided with a handheld device, preferably but not necessarily comprising a sensor or sensors. The earlier mentioned acknowledgment means 10 enabling the inspector 4 to confirm and complete a selection of a poultry carcass and/or viscera package to be rejected, may be embodied in such a handheld device. Such a handheld device is very handy for the inspector to make the appropriate selections, particularly when the handheld device is provided with a sensor or sensors that determine the position and/or orientation of the handheld device which can then be used for the selection of a particular poultry carcass and/or viscera package that is to be rejected.

Figure 4:
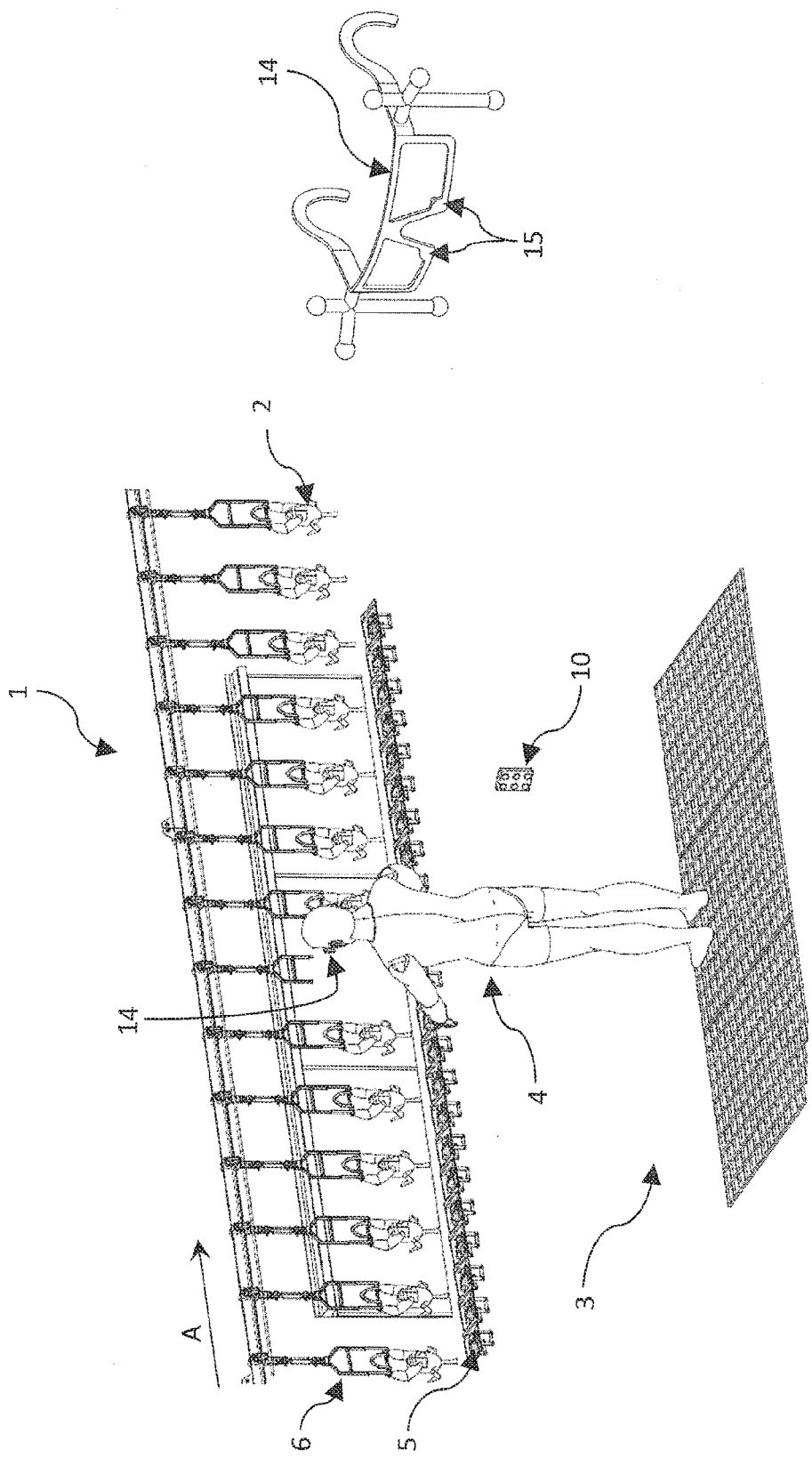
FIG. 4 shows a second exemplary embodiment of a processing line with an inspection facility according to an exemplary embodiment of the invention.

FIGS. 4 and 5 depict further exemplary embodiments of the invention wherein the sensor of the inspection facility is a camera system which is arranged to monitor and determine the position and/or orientation of an inspectors bodily part and/or a pointer held by the inspector, which is used to determine a particular poultry carcass and/or viscera package that is to be rejected.

FIG. 4 shows an embodiment in which the inspection facility 3 includes glasses 14 to be worn by an inspector 4, which glasses 14 are provided with a camera system 15 for monitoring the inspectors eyeball or eyeballs to determine the particular poultry carcass 2 and/or viscera package 5 that is to be rejected. The inspector 4 thus simply has to look at the particular poultry carcass 2 and/or viscera package 5 and the camera system 15 is used to determine the line of sight of the inspector 4 to identify therewith the poultry carcass 2 and/or viscera package 5 that is to be rejected. Also in this embodiment an acknowledgment means 10 embodied as a remote control device with push buttons can be employed to confirm the selection of the particular poultry carcass 2 and/or viscera package 5 that is selected as being rejected. Yet also in this embodiment it is possible to apply the alternative of embodying the acknowledgment means otherwise, for instance with voice control means or with gesture control means.

In the embodiment of FIG. 4 it may be appropriate in order to avoid interference of the video feedback system with the selection of a particular poultry carcass and/or a viscera package by means of a determination of the line of sight of the inspector, to employ a beamer or beamers (as discussed hereinafter with reference to the embodiment of FIG. 5A/5B) that project light of a particular color representative of either approval or rejection on the concerning poultry carcasses 2. On the other hand it is not excluded that also in this embodiment the provision of a visual feedback is arranged by applying a support adjacent to the path of the poultry carcasses 2 and/or viscera packages 5 in the processing line 1, wherein the support is provided with a moving light bar that is arranged with light of different colors respectively reflecting approved and rejected poultry carcasses 2 and/or viscera packages 5.

FIG. 5A/B show a most preferred embodiment of the processing line 1 of the invention in which the sensor is a 3-D camera system 15 (see FIG. 5B) which is arranged to monitor and determine the position and/or orientation of the inspectors hand 4' to determine a particular poultry carcass 2 and/or viscera package 5 that is to be rejected. Again the system can then also be arranged that instead of the inspectors hand 4' the position and/or orientation of a (not shown) pointer held by the inspector is determined.

Again also in this embodiment the inspection facility 3 includes acknowledgment means 10 enabling an inspector 4 to confirm and complete the selection of a poultry carcass 2 and/or viscera package 5 as to be rejected. Consistent with the other examples provided in this description, the acknowledgment means are selected from the group comprising voice controlled acknowledgment means and/or gesture controlled acknowledgment means and/or the push button 11 controlled acknowledgment means 10 that are depicted in FIG. 5A.

Preferably the acknowledgment means 10 are arranged to provide an intrinsic link to a selection of a particular cause or reason of rejecting the poultry carcass 2 and/or the viscera package 5, which can easily be implemented with the application of several push buttons 11 each representing a different cause or reason for rejection. As already mentioned above these different causes or reasons for rejection can also be linked to particular voice commands in a voice controlled system, or to particular gestures when the 3-D camera 15 is also used for acknowledging the selection of a poultry carcass 2 and/or viscera package 5 to be rejected.

FIGS. 5A and 5B further depict that the inspection facility 3 is provided with visual feedback means regarding the poultry carcass 2 and/or the viscera package 5 that is selected to be rejected. These visual feedback means are embodied with a beamer 16 (or several beamers) to project light of different colors respectively reflecting approved and rejected poultry carcasses 2 and/or viscera packages 5, wherein the beamer 16 is arranged to move the respective lights of the beamer 16 synchronously with the concerning poultry carcasses 2 and/or viscera packages 5 to maintain its projection of light on the poultry carcasses 2 and/or viscera packages 5 consistent with the approvals and rejections provided by the inspector 4 concerning such poultry carcasses and/or viscera packages. It is however remarked that in this embodiment it is also possible to apply a moving light bar as visual feedback for the inspector 4, which moving light bar is then placed adjacent to the path of the poultry carcasses and/or viscera packages in the processing line 1. Again also in this embodiment the moving light bar is preferably provided with light of different colors respectively reflecting approved and rejected poultry carcasses and/or viscera packages, wherein the respective lights of the moving light bar are arranged to move synchronously with and in keeping with the respective approved and rejected poultry carcasses and/or viscera packages.

Although the invention has been discussed in the foregoing with reference to several exemplary embodiments of the processing line for poultry of the invention, the invention is not restricted to these particular embodiments which can be varied in many ways without departing from the gist of the invention. The discussed exemplary embodiments shall therefore not be used to construe the appended claims strictly in accordance therewith. On the contrary the embodiments are merely intended to explain the wording of the appended claims without intent to limit the claims to the exemplary embodiments. The scope of protection of the invention shall therefore be construed in accordance with the appended claims only, wherein a possible ambiguity in the wording of the claims shall be resolved using these exemplary embodiments.

What is claimed is:

1. A method for inspecting a poultry carcass, a viscera package, or both, taken out from the poultry carcass, the method comprising:
   moving the poultry carcass, viscera package, or both along a processing line;
   actuating a noncontact sensor that is arranged to provide signals indicative of a position or orientation of a bodily part of an inspector, a pointer held by the inspector, or both; and
   moving the bodily part, the pointer, or both to a position that identifies a particular poultry carcass, viscera package, or both, that is to be rejected;
   wherein the method is executed without the inspector touching the poultry carcass or the viscera package.

2. The method according to claim 1, wherein the sensor is provided with a cooperating source of ultrasonic waves or laser, and wherein the sensor and source of ultrasonic waves or laser cooperate to determine a position of a hand of the inspector, a pointer of the inspector, or both, when the inspector moves the hand, pointer, or both, to a position that identifies the particular poultry carcass, viscera package, or both, that is to be rejected.

3. The method according to claim 1, wherein a handheld device is provided comprising a sensor or sensors to determine the position, orientation, or both, of the handheld device, wherein the inspector moves the handheld device to a position or orientation that identifies the particular poultry carcass, viscera package, or both that is to be rejected.

4. The method according to claim 1, wherein the sensor comprises a camera system arranged to monitor and determine the position or orientation of the inspector's bodily part, a pointer supported by the inspector, or both, when the inspector moves the bodily part, pointer, or both, to a position or orientation that identifies the particular poultry carcass, viscera package, or both, that is to be rejected.

5. The method according to claim 4, further comprising monitoring the inspector's eyeball or eyeballs using glasses worn by the inspector, wherein the glasses are provided with the camera system for monitoring the inspectors eyeball or eyeballs when the inspector looks at the particular poultry carcass, viscera package, or both, to identify same as the poultry carcass, viscera package, or both, that is to be rejected.

6. The method according to claim 1, operating acknowledgement means to confirm and complete the actuation of the sensor for determining the particular poultry carcass, viscera package, or both, that is to be rejected.

7. The method according to claim 6, wherein the acknowledgment means are voice controlled, gesture controlled, push button controlled, or a combination thereof.

8. The method according to claim 6, wherein the acknowledgment means provides an intrinsic link to selecting a particular cause or reason of rejecting the poultry carcass, viscera package, or both.

9. The method according claim 1, further comprising providing the inspector with visual feedback regarding the poultry carcass, the viscera package, or both, that is selected to be rejected.

10. The method according to claim 9, providing a moving light bar adjacent to the processing that is arranged with light of different colors respectively reflecting approved and rejected poultry carcasses, viscera packages, or both, wherein the respective lights of the moving light bar move synchronously with and in keeping with the concerning poultry carcasses, viscera packages, or both.

11. The method according to claim 9, providing one or more beamers to project light of different colours respectively reflecting approved and rejected poultry carcasses, viscera packages, or both, wherein the respective lights of the beamers move synchronously with the concerning poultry carcasses, viscera packages, or both, to maintain their projection of light on the poultry carcasses, viscera packages, or both, consistent with the approvals and rejections concerning the poultry carcasses, viscera packages, or both.

12. An inspection facility for a processing line for poultry, the inspection facility enabling an inspector to inspect poultry carcasses, viscera packages, or both, moving in the processing line, the inspection facility comprising:
   a noncontact sensor that is arranged to provide signals indicative of a position or orientation of a bodily part of an inspector or of a pointer held by the inspector to determine a particular poultry carcass, a viscera package, or both, that is to be rejected; and
   wherein the inspection facility is arranged to enable the inspector to select the particular poultry carcass, viscera package, or both, to be rejected without touching the poultry carcass or viscera package.

13. The inspection facility as in claim 12, further comprising:
   a source of ultrasonic waves or laser that cooperates with the sensor to determine a position of the inspectors hand, a pointer held by the inspector, or both, so as to determine a particular poultry carcass, viscera package, or both, that is to be rejected.

14. The inspection facility as in claim 12, further comprising:
   a handheld device that is provided with one or more sensors that determine the position or orientation of the handheld device to determine a particular poultry carcass, viscera package, or both that is to be rejected.

15. The inspection facility as in claim 12, wherein the sensor of the inspection facility comprises:
   a camera system arranged to monitor and determine the position or orientation of an inspectors bodily part, a pointer held by the inspector, or both to determine a particular poultry carcass, viscera package, or both that is to be rejected.

16. The inspection facility as in claim 15, wherein the inspection facility comprises:
   glasses to be worn by an inspector, the glasses comprising the camera system for monitoring the inspectors eyeball or eyeballs to determine a particular poultry carcass, viscera package, or both, that is to be rejected.

17. The inspection facility as in claim 12, further comprising: acknowledgment means enabling an inspector to confirm and complete actuation of the sensor for determining the particular poultry carcass, viscera package, or both, that is to be rejected.

18. The inspection facility as in claim 17, wherein the acknowledgment means is selected from the group comprising voice controlled acknowledgment means, gesture controlled acknowledgment means, and push button controlled acknowledgment means.

19. The inspection facility as in claim 17, wherein the acknowledgment means are arranged to provide an intrinsic link to a selection of a particular cause or reason of rejecting the poultry carcass, the viscera package, or both.

20. The inspection facility as in claim 12, further comprising visual feedback means regarding the poultry carcass, the viscera package, or both, that is selected to be rejected.

21. The inspection facility as in claim 20, wherein adjacent to the path of the poultry carcass, viscera package, or both, in the processing line a moving light bar is provided which is arranged with light of different colors respectively reflecting approved and rejected poultry carcasses, viscera packages, or both, wherein the respective lights of the moving light bar are arranged to move synchronously with and in keeping with the respective approved and rejected poultry carcasses or viscera packages.

22. The inspection facility as in claim 20, further comprising:
   one or more beamers projecting light of different colors respectively reflecting approved and rejected poultry carcasses, viscera packages, or both, wherein the beamers are arranged to move the respective lights of the beamer or beamers synchronously with the concerning poultry carcasses or viscera packages to maintain their projection of light on the poultry carcasses or viscera packages consistent with the approvals and rejections concerning such poultry carcasses or viscera packages.

\* \* \* \* \*